US011886524B2

United States Patent
Carbune et al.

(10) Patent No.: US 11,886,524 B2
(45) Date of Patent: Jan. 30, 2024

(54) LIMITING PROVISION AND DISPLAY OF REDUNDANT DIGITAL COMPONENTS ON A CLIENT DEVICE

(71) Applicant: Google LLC, Mountain View, CA (US)

(72) Inventors: Victor Carbune, Winterthur (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/428,764

(22) PCT Filed: Nov. 23, 2020

(86) PCT No.: PCT/US2020/061767
§ 371 (c)(1),
(2) Date: Aug. 5, 2021

(87) PCT Pub. No.: WO2021/221718
PCT Pub. Date: Nov. 4, 2021

(65) Prior Publication Data
US 2023/0038126 A1 Feb. 9, 2023

(30) Foreign Application Priority Data

Apr. 27, 2020 (RO) .............................. a/00225/2020
May 22, 2020 (RO) .............................. a/00282/2020

(51) Int. Cl.
*G06F 16/9538* (2019.01)
*G06F 9/50* (2006.01)
*G06F 9/451* (2018.01)

(52) U.S. Cl.
CPC .......... *G06F 16/9538* (2019.01); *G06F 9/451* (2018.02); *G06F 9/5027* (2013.01)

(58) Field of Classification Search
CPC ..... G06F 16/9538; G06F 9/451; G06F 9/5027
(Continued)

(56) References Cited

U.S. PATENT DOCUMENTS

2009/0019367 A1* 1/2009 Cavagnari ............... G06F 21/84
715/716
2016/0125842 A1* 5/2016 Weinberg ................. G06F 3/14
345/629
(Continued)

FOREIGN PATENT DOCUMENTS

JP 2017-162212 9/2017
JP 2019-523956 8/2019
(Continued)

OTHER PUBLICATIONS

Office Action in European Appln. No. 20829399.3, dated Jul. 5, 2022, 8 pages.
Office Action in Japanese Appln. No. 2021-547741, dated Oct. 24, 2022, 6 pages (with English translation).
(Continued)

*Primary Examiner* — Joshua Bullock
(74) *Attorney, Agent, or Firm* — Fish & Richardson P.C.

(57) ABSTRACT

Methods, systems, and apparatus, including computer programs encoded on a computer storage medium, for limiting provision and display of redundant digital components on a client. Methods can include storing, by a client device, a list of digital components specifying digital components available for provision to the client device. For a first digital component received within a first application, the client device detects a set of signals specifying a first user interaction with the first digital component and a second user interaction with content provided in response to the first user interaction. Based on whether an affirmative user action was performed, the client device can modify the list of digital components. When a request to access a content page within a second application is received, the client device can receive the second digital component, which can be selected from among digital components included on the modified list of digital components.

20 Claims, 4 Drawing Sheets

(58) Field of Classification Search
USPC .......................................................... 707/723
See application file for complete search history.

(56) References Cited

U.S. PATENT DOCUMENTS

| | | | |
|---|---|---|---|
| 2017/0075886 A1* | 3/2017 | Moore | G06F 16/44 |
| 2017/0272526 A1* | 9/2017 | Bazar | H04L 67/63 |
| 2019/0114216 A1 | 4/2019 | Wu | |
| 2023/0298583 A1* | 9/2023 | Sharifi | G10L 25/78 |
| | | | 704/251 |

FOREIGN PATENT DOCUMENTS

| | | |
|---|---|---|
| KR | 10-2015-0129955 | 11/2015 |
| KR | 10-2019-0017967 | 2/2019 |

OTHER PUBLICATIONS

International Search Report and Written Opinion in International Appln. No. PCT/US2020/061767, dated Feb. 18, 2021, 11 pages.
International Preliminary Report on Patentability in International Appln. No. PCT/US2020/061767, dated Nov. 10, 2022, 10 pages.
Office Action in India Appln. No. 202127033988, dated Dec. 15, 2022, 6 pages (with English translation).
Office Action in Korean Appln. No. 10-2021-7027304, dated May 1, 2023, 11 pages (with English translation).
Notice of Allowance in Japanese Appln. No. 2021-547741, dated Apr. 10, 2023, 5 pages (with English translation).
Office Action in European Appln. No. 20829399.3, dated Apr. 4, 2023, 10 pages.
Notice of Allowance in Korean Appln. No. 10-2021-7027304, dated Aug. 1, 2023, 7 pages (with English translation).

* cited by examiner

| | PRODUCT 202 | CATEGORY 204 | USER ACTION 206 | RANK 208 |
|---|---|---|---|---|
| 1 | L | CAMERA | SEARCH | 1 |
| 2 | - | HOTEL | SEARCH | 1 |
| 3 | B | HOTEL | WEBSITE | 2 |
| 4 | C | HOTEL | WEBSITE | 3 |
| 5 | - | RENTAL CAR | SEARCH | 1 |
| 6 | Q | RENTAL CAR | WEBSITE | 2 |
| 7 | R | RENTAL CAR | WEBSITE | 3 |

FIG. 2

LIMITING PROVISION AND DISPLAY OF REDUNDANT DIGITAL COMPONENTS ON A CLIENT DEVICE

CROSS-REFERENCE TO RELATED APPLICATION

This application is a National Stage Application under 35 U.S.C. § 371 and claims the benefit of International Application No. PCT/US2020/061767, filed Nov. 23, 2020, which claims priority to RO Application No. A/00282/2020, filed Apr. 27, 2020, and RO Application No. A/00225/2020, filed Apr. 27, 2020, the disclosure of which are incorporated herein by reference.

BACKGROUND

This specification relates to limiting provision and display of redundant digital components on a client device based at least on prior user interactions and/or user actions with such digital components and/or any additional content related thereto.

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/platform. For example, if a browser application executing on a client device is used to perform an internet search for "rental cars," a content source and/or platform can provide a search results page that includes a digital component providing information about rental cars from a rental car company and a link to that company's website.

SUMMARY

In general, one innovative aspect of the subject matter described in this specification can be embodied in methods including the operations of storing, by a client device, a list of digital components specifying a set of digital components available to be provided to an application executing on the client device; receiving, within a first application executing on the client device, a first digital component provided by a first content provider; detecting, by the client device, a set of signals specifying (i) a first user interaction with the first digital component and (ii) a second user interaction with content provided in response to the first user interaction with the first digital component; determining, by the client device and based on the set of signals, that an affirmative user action was performed by a user of the client device, wherein the affirmative user action represents performance of a specified target action by the user after the first user interaction with the first digital component; modifying, by the client device, the list of digital components based on the affirmative user action by the user after the first user interaction with the first digital component; receiving a request to access a content page within a second application executing on the client device wherein the first application is different from the second application; in response to receiving the request to access the content page, sending, to a second content provider wherein the first content provider is different from the second content provider, a request for content that includes a portion of the modified list of digital components that prevents selection of the first digital component responsive to the request for content; in response to the request for content, receiving, by the client device and within the second application, a second digital component from the second content provider, wherein the second digital component is selected from among digital components included on the modified list of digital components; and providing the second digital component for display on the content page within the second application.

Other embodiments of this aspect include corresponding methods, apparatus, and computer programs, configured to perform the actions of the methods, encoded on computer storage devices. These and other embodiments can each optionally include one or more of the following features.

Methods can further include inputting the set of signals associated with the first digital component into a machine learning model that predicts whether, based on a particular set of signals associated with a particular digital component, the user had an affirmative user action with the particular digital component, wherein the machine learning model is trained using training data for a plurality of training digital components, wherein the training data for each training digital component includes a set of signals associated with the training digital component and a corresponding label indicating whether a user had an affirmative user action with the training digital component; and obtaining, from the machine learning model and in response to the set of signals associated with the first digital component that are input into the machine learning model, an indication specifying whether a user had an affirmative user action with the first digital component.

Methods can include storing a ranked list of digital components, modifying the list of digital components by lowering a rank corresponding to the first digital component in the ranked list or removing the first digital component from the list of digital components.

Methods can include sending, to a second content provider, a request for content that includes a portion of the modified list, wherein the portion of the modified list of digital components includes a top-N ranked digital components in the ranked list.

The methods may further include receiving in response to the request for content, by the client device and within the second application, a third digital component from the second content provider, wherein the third digital component is not among digital components included on the modified list of digital components; suppressing the third digital component from display on the content page; and in response to the suppressing, modifying a content layout of the content page and providing a message to the second content provider indicating that the third digital component was suppressed.

Particular embodiments of the subject matter described in this specification can be implemented to realize one or more of the following advantages. For example, the techniques described in this specification enable filtering out (e.g., preventing retrieval and/or display of) certain digital components (or types of digital components) with which the user of the client has already had an affirmative user action (as further described in this specification), thereby saving significant number of computing resources required in the provision and rendering of such digital components. This in turn can also facilitate improved user experience and user engagement across multiple content platforms by avoiding repetitive presentation of same/similar digital components. Conventional systems did not include the ability to prevent presentation of the same or similar digital component provided by multiple different content sources/platforms. In contrast, the techniques described in this specification can prevent provision and/or rendering of digital component(s) with which a user has already had an affirmative user action and thus, enabling provision and display of digital components with which a user has not already had an affirmative user action instead of presenting content that the user has already experienced and acted upon. By preventing the presentation of content that the user has already experienced and acted upon, the system reduces the amount of wasted computing resources (e.g., processing resources, network bandwidth, limited display space, etc.) that is caused by providing the user with redundant content. In addition, the limited display space of the client device is more efficiently used as the space that would have been occupied by the prevented content may instead be beneficially used for other content or other purposes.

The techniques described in this document also facilitate improved security and privacy of data associated with the processing, analyzing, and/or maintaining of interactions with digital components and/or any associated device actions on the client device. In some conventional implementations, security and/or privacy of the data may not be maintained or even feasible when such data is to be shared with, and thus exposed to, a third party system. In contrast, the techniques described in this specification can be implemented on the client device, such that the detection, processing, and storage of the set of signals that are used to infer an affirmative user action and the determination of an affirmative user action can be performed and stored entirely on the client device. Moreover, the techniques described in this specification do not require sharing of such data with third party systems.

Further still, the techniques described in this specification enable dynamic modification of the interface displayed on the client device. The techniques described in this specification can enable the client device to suppress, remove, and/or prevent display of certain digital components for which an affirmative user action has already happened. In such cases, the techniques described herein can dynamically modify the interface such that the location within which the suppressed/removed digital component is to be displayed is replaced with other content (e.g., content already included on the page that might be adjusted (e.g., reorganized/moved/resized), or other content, which may be obtained from a content source/platform.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a table showing an example list of digital components stored on the client device.

DETAILED DESCRIPTION

Figure 1:
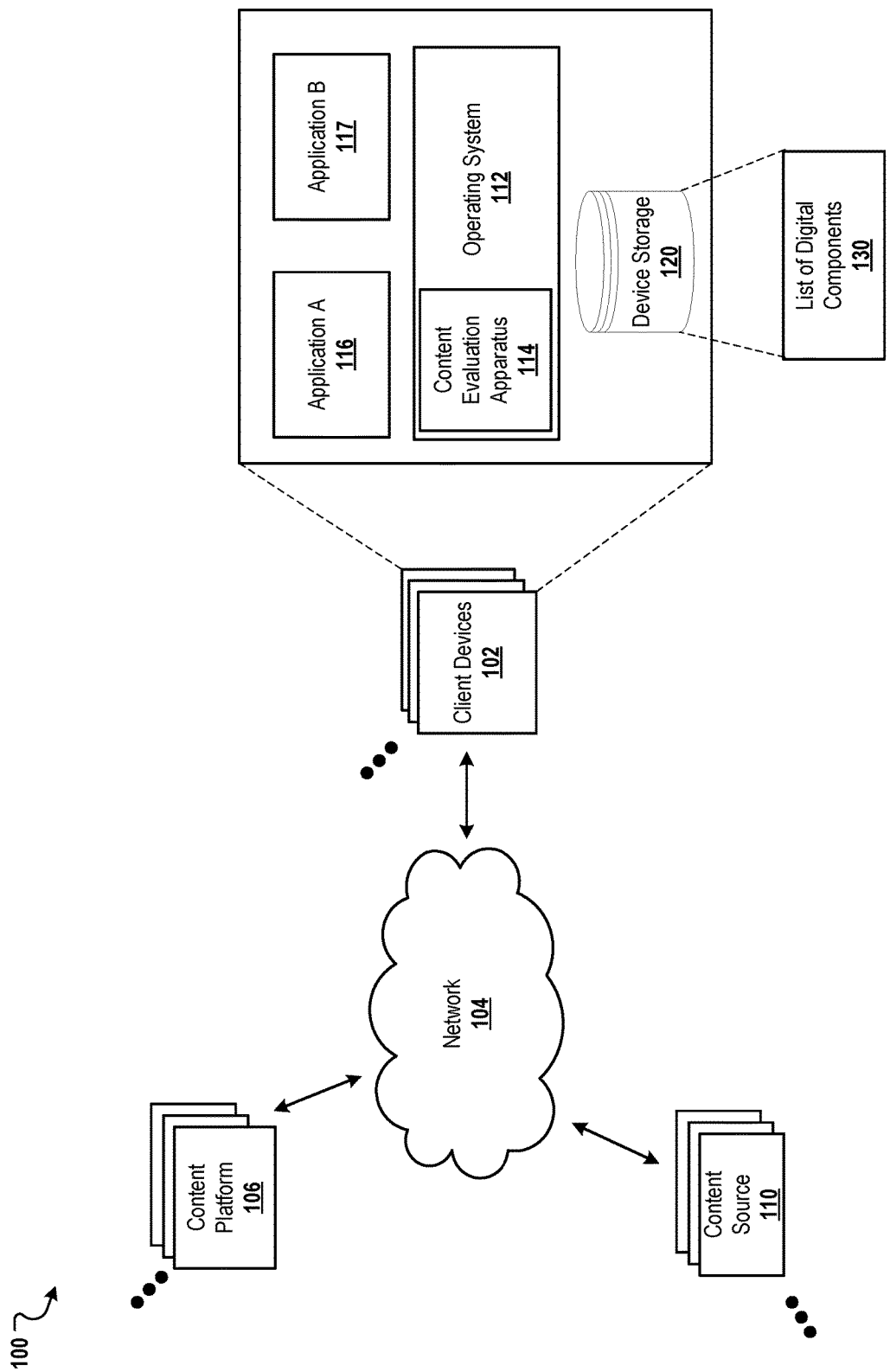
FIG. 1 is a block diagram of an example environment where digital content is distributed and presented to a client device.

This specification generally relates to limiting provision and display of redundant digital components on a client device based at least on prior user interactions and/or user actions with such digital components and/or any additional content related thereto.

Client devices (e.g., smart phones, tablet, and personal computers) connected to the internet can be provided with digital content that includes a variety of digital components. As used throughout this document, the phrase "digital component" refers to a discrete unit of digital content or digital information (e.g., a video clip, audio clip, multimedia clip, image, text, or another unit of content).

User interactions and/or user actions with a digital component can ultimately result in an affirmative user action, which represents the performance of a particular target event/action after presentation of and/or interaction with the digital component. For example, a user that is exposed to a digital component about endangered species may interact with that component (e.g., by selecting or clicking on that component) and be directed to a web page about a particular endangered species, where the user may sign up for a newsletter directed to helping save that endangered species. In this example, signing up for the newsletter can be considered the particular target action. Examples of target actions can also include, but are not limited to, registering with a website/service, adding items to an online cart, downloading a whitepaper, acquiring a product, navigating to at least a given depth of a website, viewing at least a certain number of web pages, spending at least a predetermined amount of time on a website or web page, completing a website registration process, and subscribing to a digital service. In other words, a particular target action may be an interaction, by a user, with content provided to the user subsequent to the user's interaction with the digital component. A user may perform a first interaction with first content of the digital component and, subsequent to that first interaction, then perform a second interaction with second content provided to the user due to the first interaction. The first and second interactions may be the generation of a signal due to one or more inputs from the user. The inputs from the user may be via a touchscreen, keypad, microphone, video, or any other means of interacting with the client device.

When a client device revisits the same or different content platform within an application executing on a client device, a digital component that is the same as or similar to a digital component previously provided to the client device, may be provided to the client device again. Such redundant provision of same/similar digital component may occur even if the client device previously had an affirmative user action with such digital component. An affirmative user action is denoted by the performance of a particular target action subsequent to a user interaction with that digital component. Moreover, in some systems, even if one content source/platform determines that a user of a client device has had an affirmative user action with a particular digital component, that determination of an affirmative user action may not be known to another content source/platform that the client device may subsequently access. As a result, the other content source/platform may provide the same or similar type of digital component with which an affirmative user action has already been encountered. For example, assume that a particular digital component has been submitted to two disparate content distribution systems that do not share data. In this situation, even if one of the content distribution systems were aware that a particular user completed a target action after interacting with the particular digital component, the other disparate content distribution system would be completely unaware of the performance of the target action, such that the particular digital component may continue to be presented to the particular user.

In contrast, the techniques described in this document can be implemented entirely (or in significant part) on the client device (i.e., independent of a particular content source/platform). As described further in this specification, the client device can determine an affirmative user action with a digital component using multiple signals based on the past user activity on the client device, user interaction with digital components the client device irrespective of the content source/platform of the digital component, the content platform on which the digital component(s) was/were provided, or the application(s) within which the digital component was obtained. In some implementations, the multiple signals are analyzed using/processed by a machine learning model (or a heursitics-based approach, or another appropriate model-based or rules-based technique), which determines whether the client device had an affirmative user action with a digital component.

Based on whether the client device had an affirmative user action with a particular digital component, the techniques described herein can modify a stored list (i.e., stored on the client device) of digital components (e.g., a cookie list), which specifies a set of digital components that are available to be provided to an application executing on the client device. For example, in response to a user's interaction (e.g., selected, clicked, viewed) with a digital component for a rental car company, the list of digital components may be updated to include a specific entry that provides an indication of the digital component (e.g., the name of the digital component, the category/type of the digital component, the activity performed by the user while interacting with the digital component). However, if the machine learning model (or another appropriate approach/model) determines that the client device had an affirmative user action with the digital component, the machine learning model (or other appropriate approach/model) may update the list of digital components, e.g., by either removing the particular digital component from the list or lowering its rank on the list (if it is already on the list) or by not adding the particular digital component to the list (if it is not already on the list).

Subsequently, when the client device uses an application to access the same or different content platform, the techniques described herein can send a portion of the modified list of digital components (e.g., the entire list or a subset of the list, such as the top N ranked components included on the list) to the content platform (and/or the content source(s) that provides content for the content platform). The content platform and/or the content source(s) can use this modified list of digital components in providing content for display within the application executing on the client device. For example, the content source and/or content platform can only provide one or more digital components that are included on the received portion of the list of digital components. In such cases, the application executing on the client device renders the digital components provided by the content source/platform. As another example, the content source(s) and/or content platform(s) can provide any one or more digital components, irrespective of whether they are on the list. In such cases, the client device can determine whether the digital components provided are on the modified list of digital components (e.g., whether the provided digital component is one of the top N digital components on the list of digital components). If so, the application executing on the client device can render/display the provided digital components. Otherwise, the application can suppress such content and instead modify the interface such that the location within which the suppressed/removed digital component is to be displayed is replaced with other content (e.g., content already included on the page that might be adjusted, e.g., reorganized/moved/resized), or other content, which may be obtained from a content source/platform).

These features and additional features are further described below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which content is distributed and presented to a client device. The example environment 100 includes a network 104, such as a local area network (LAN), a wide area network (WAN), the Internet, or a combination thereof. The network 104 connects client devices 102, content platforms 106, and content sources 110. The example environment 100 may include many different content sources 110, content platforms 106, and client devices 102.

A content platform 106 is a computing platform that enables distribution of content. Example content platforms 106 include search engines, social media platforms, news platforms, data aggregator platforms, or other content sharing platforms. Each content platform 106 may be operated by a content platform service provider.

The content platform 106 may publish and make available on the platform, its own content. For example, the content platform 106 may be a news platform, which publishes its own news articles. The content platform 106 may also present content provided by one or more content sources 110. In the above example, the news platform may also present content created by different authors and provided by one or more content sources 110. As another example, the content platform 106 may be a data aggregator platform that does not publish any of its own content, but aggregates and presents news articles provided by different news websites (i.e., content sources 110).

A client device 102 is an electronic device that is capable of requesting and receiving content over the network 104. Example client devices 102 include personal computers, mobile communication devices, digital assistant devices, and other devices that can send and receive data over the network 104.

A client device 102 typically comprises an operating system 112 that is primarily responsible for managing the device hardware and software resources such as applications. The client device 102 also comprises a device storage 120 to store data temporarily or permanently based on the particular implementation, application, and use case. A client device 102 typically includes user applications 116 and 117, such as a web browser, to facilitate the sending and receiving of data over the network 104, but native applications executed by the client device 102 can also facilitate the sending and receiving of content over the network 104. Examples of content presented at a client device 102 include webpages, word processing documents, portable document format (PDF) documents, images, videos, and search results pages and digital ads.

In general, the client device 102 interacts with applications executing on the client device 102 to access digital content, such as search results, web pages, news articles, and social media posts. While accessing the digital content, the client device may also receive digital components from one or more content providers.

For example, assume that a user uses the application A 116, which is a web browser to perform an internet search for "rental cars" and reviews search results returned in response to submission of the search query "rental cars." In such a scenario, a third party (i.e., an entity other than the client device, such as a content platform or content source) may provide to the application, digital components (e.g., videos, text) that may be related to the search query and with which the user can interact (e.g., by selecting or clicking on the digital components, or viewing the content presented in the digital component for a certain period).

Such interactions with these digital components can result in the application opening (or redirecting to) another content page with additional content/digital components that may be related to the subject matter of the selected digital component. For example, assume that while reviewing the search results returned in response to a submission of the search query "rental cars," the user interacts with a digital component by either selecting or clicking a link. In this example, the client device 102 can open up an application B 117 which is an application (e.g., a native application) installed on the client device 102 and is provided by a particular rental car company. In another example, selecting or clicking the link can redirect the user, within Application A 116, to another website that comprises digital content related to the search query "rental cars" such as reviews of different car rental services or a webpage of a car rental service.

The client device 102 further comprises a content evaluation apparatus 114 (which can be a data processing apparatus, as described in this specification). In some implementations, the content evaluation apparatus 114 is implemented as a machine learning model comprising multiple trainable parameters and is trained to determine an affirmative user action of the user with digital components that are presented on the client device 102 by analyzing a set of signals (as further described below). The machine learning model can be any model deemed suitable for the specific implementation, such as decision trees, artificial neural network, genetic programming, logic programming, support vector machines, clustering, reinforcement learning, Bayesian inferencing, etc. Machine learning models may also include methods, algorithms and techniques for natural language processing for analyzing signals that comprises textual data.

In some implementations, the machine learning model implemented within the content evaluation apparatus 114 is trained using training data for multiple training digital components. Each training digital component in the training data is associated with a corresponding set of signals for the training digital component and a label indicating whether a user had an affirmative user action with the training digital component. For example, a training digital component comprises a set of signals generated by the user interaction with a particular digital component (and/or actions/interaction with other content/applications/digital components on the client device 102) and a label that states whether the user action with the particular digital component is affirmative.

In some implementations, training the machine learning model involves adjusting the trainable parameters of the machine learning model such that the machine learning model can analyze multiple signals generated by user activity and user interaction with digital components to predict whether the user action with the digital components provided by the content provider is affirmative. Depending on the specific implementation, the training process of the machine learning model can be supervised, unsupervised, or semi-supervised.

In some implementations, in addition to the user interactions and/or user actions with the particular digital component, the machine learning model can process multiple additional signals generated from user activity on the client device. These signals comprise but are not limited to clicks on different links provided in digital components, internet search keywords, and time spent viewing different digital components. For example, if the client device is provided a digital component with a link to a website pertaining to a particular product (or service or other content) during execution of the application, the user might click the link and visit the linked website. In this case, the OS detects the user interaction (clicking or selecting) and generates a signal that is provided to the content evaluation apparatus. In another example, when the client device is provided a digital component comprising a video, the OS can detect that the user skipped the video (e.g., by scrolling past the digital component) or may spend some time watching the video (e.g., by not scrolling the page for a certain threshold amount of time). The OS thus generates a signal denoting the amount of time spent on the video digital component and provides this signal for further processing by the machine learning model.

In some implementations, the machine learning model implemented within the content evaluation apparatus 114 may predict an affirmative user action of the user with digital components based, in addition to user interaction signals described above, on signals that are generated by user exposure to digital components that is presented on the client device 102. Such implementations may use techniques well known in the art of digital image processing and natural language processing such as optical character recognition (OCR). For example, assume that the client device is interacting with a third party application such as an application provided by a car rental company to book a rental car, the image of the rendered user interface may be used to identify the affirmative user action of the user with a digital component. In another example, assume that the user gets a web push notification in a browser application executing on the client device 102 regarding a booking confirmation of the rental car. Based on the type of implementation, the OS can generate multiple signals from the web push notification such as the image of the user interface that presents the web push notification to the user on the client device 102, or the text of the web push notification. These signals can be analyzed by the machine learning model to determine an affirmative user action of the user with the digital components.

In some implementations, the machine learning model implemented within the content evaluation apparatus 114 processes the set of signals generated by user interaction with digital component and other actions on the client device, as described above (e.g., a first user interaction with the digital component and one or more additional user interactions and/or user actions with content provided in response to the first user interaction), to determine whether an affirmative user action was performed. In some implementations, the machine learning model may generate a score or a likelihood of an affirmative user action based on the input set of signals. For example, the likelihood or score of an affirmative user action can be a number on a scale from 0 to 10, where a number closer to 0 indicates a lower likelihood or score of an affirmative user action, and a number closer to 10 indicates a higher likelihood/score of an affirmative user action. In such implementations, there might be a preset threshold that might suggest an affirmative user action if the likelihood of the affirmative user action is more than the preset threshold. For example, assume that the preset threshold of the likelihood is set at 5. If the machine learning model generates a likelihood of the user action with the digital component to be a value that is more than 5, the action is determined to be affirmative. Otherwise, the interaction is determined not to be affirmative.

In some implementations, the content evaluation apparatus 114 implements a heuristic based approach (instead of a machine learning model) for determining an affirmative user action with a digital component. In such implementations, the content evaluation apparatus 114 analyses the same set of signals (as described above) generated by the user interaction with digital components provided by content source/platform to the client device 102.

In some implementations, the content evaluation apparatus 114 operates at an operating system (OS) level on a client device 102, as opposed to operating at an application level for a specific application. As used in this description, an operation at the OS level is either an operation that has access to higher privileges than an operation at an application level, and/or an operation performed by an operating system.

By way of a further example, an OS level operation may access data being processed by multiple different applications, and provide this data to the machine learning model (or another appropriate model or heuristics based approach) so that it can determine whether an affirmative user action was performed. Thus, by operating at the OS level, the machine learning model is agnostic with respect to the applications and is capable of determining an affirmative user action by analyzing data accessed by the client device 102.

Although not shown in FIG. 1, in some implementations, the content evaluation apparatus 114 can be implemented at the application level (instead of being implemented at the OS level). In such implementations, the application implementing the content evaluation apparatus 114 can be provided higher privileges than other applications executing at the application level of the operating system 112. In such implementations, the application implementing the content evaluation apparatus 114 may have the privilege of accessing the contents of another application. Upon accessing the content by the application implementing the content evaluation apparatus 114, the machine learning model (or another appropriate model or heuristics based approach) determines whether an affirmative user action occurred.

In some implementations, the client device 102 stores a list of digital components 130 in the device storage 120. The list of digital components 130 (e.g., a cookie list) comprises a list of digital components that are available to be provided to an application executing on the client device 102. The list of digital components 130 is further explained with respect to FIG. 2.

As further described with reference to FIG. 3, this list of digital components is modified based on the determination as to whether the client device had an affirmative user action with a particular digital component. As further described with reference to FIG. 3, this modified list of digital components is subsequently used by a content platform and/or content source(s) in providing digital components for display within an application, such that the provided digital components are different from the digital component(s) (or types of digital component(s)) with which the client device has already had an affirmative user action.

FIG. 2 is a table showing an example list of digital components 130 stored on client device 102.

In some implementations, each entry in the list of digital components 130 comprises a specific digital component that can be presented to the client device. The digital components are identified on this list based on prior user interactions and/or user actions with such digital components. Each entry in the list of digital components 130 may further comprise multiple features based on the type of digital component and user activity. For example, the columns product 202, category 204, user action 206 and rank 208 represent different features or characteristics of user activity or user interaction with digital components.

In some implementations, the features or the characteristics are directly associated with or inferred from the user activity or user interaction with digital components. For example, assume that a user searches for "rental cars" and obtains a content page including search results returned in response to submission of the search query "rental cars" as well as digital components that depict particular rental car services. In this example, an entry is created in the list of digital components 130 on the client device that represents the subject matter of the particular digital component with which the user initially interacted. For example, entry 5 in the table indicates user action of performing an internet search for rental cars. Further in this example, the user may interact with (e.g., by selecting or clicking on) one of these digital components, which may redirect the user to a particular third party rental car website. In this example, an entry is created in the list of digital components 130 on the client device 102 that represents that the user interacted with digital component (webpage) of a particular car rental service. For example, entry 6 in the table indicates user's interaction of visiting the webpage of a rental car company Q while entry 7 in the table indicates user's interaction of visiting the webpage of a rental car company R.

In some implementations, a portion of the list of digital components 130 is accessed (e.g., in response to being provided this list when a blind pixel on the client device fires or in response to a request for this list) by the third party such as the content platform or the content source. Based on particular entries in the list of digital components, the third party provides the user with digital components. For example, assume that the user is accessing digital content provided by a content provider using the browser application 117 installed on the client device 102. The content source/platform may send a request for the list of digital component to the client device 102. In response to the request for the list of digital components, the client device 102 may transmit a portion of the list of digital components to the content source. Upon receiving a portion of the list of digital components, the content source can provide digital components to the client device 102 for presentation to the user based on the entries listed in the portion of the list of digital components that was received by the content source/platform.

In some implementations, each entry in list of digital components 130 is ranked based on the probability that the user may interact with a particular digital component. For example, the column 208 includes the rank of each entry of the table 130 that represents a list of digital components. In some implementations, the rank of each entry in the digital component can be modified as described in the following example and as further described with reference to FIGS. 1 and 3. For example, if the machine learning model implemented within the content evaluation apparatus 114 determines that the user has booked a rental car by analyzing other digital contents accessed by the browser application the rank of the particular entries in the list of digital components 130 can be lowered. The third party such as an advertiser or a publisher upon receiving the modified list of digital components 130 from the client device 102, provides digital components based on the updated ranking of the digital components, thereby providing the user with digital components that have a higher ranking (or are in the top N ranked digital components).

In some implementations, more than one content source/platform may provide digital content to the user on the client device 102. In such implementations, the client device 102 may store the list of digital components 130 that can be modified based on the affirmative user action identified using signals generated by user interaction with digital components served by the first content source/platform. Subsequently, the second content source/platform may access a portion of the list of digital components 130 stored on the client device 102 and serve digital components based on the modified list of digital components 130.

For example, assume that an internet search for "cameras" is performed using a browser application A 116 executing on the client device 102, which results in the provision within the application A 116 of a search results page and provision of a digital component by a first content source. If the client device 102 detects an interaction with that digital component, the client device 102 adds an entry for that digital component to the list of digital components 130. Later, during another online session, the second content source/platform may access a portion of the list of digital 130 component from the client device 102 and provide digital components related to "cameras" based on the entry. If the user performs the target action (e.g., reads a review for a particular camera on the website linked by the digital component) in response to interactions with the digital components (and additional content provided in response to that interaction and with which additional interactions/actions are detected by the client device), the content evaluation apparatus 114 implemented on the client device 102 can analyze the corresponding signals detected by the OS based on such interactions/actions and modify the list of digital components 130 on the client device, e.g., by either removing the entry 212 or lowering the rank of the particular entry 212. In such a scenario, the first content source/platform may access the list of digital content and not provide ads related to "cameras."

Figure 3:
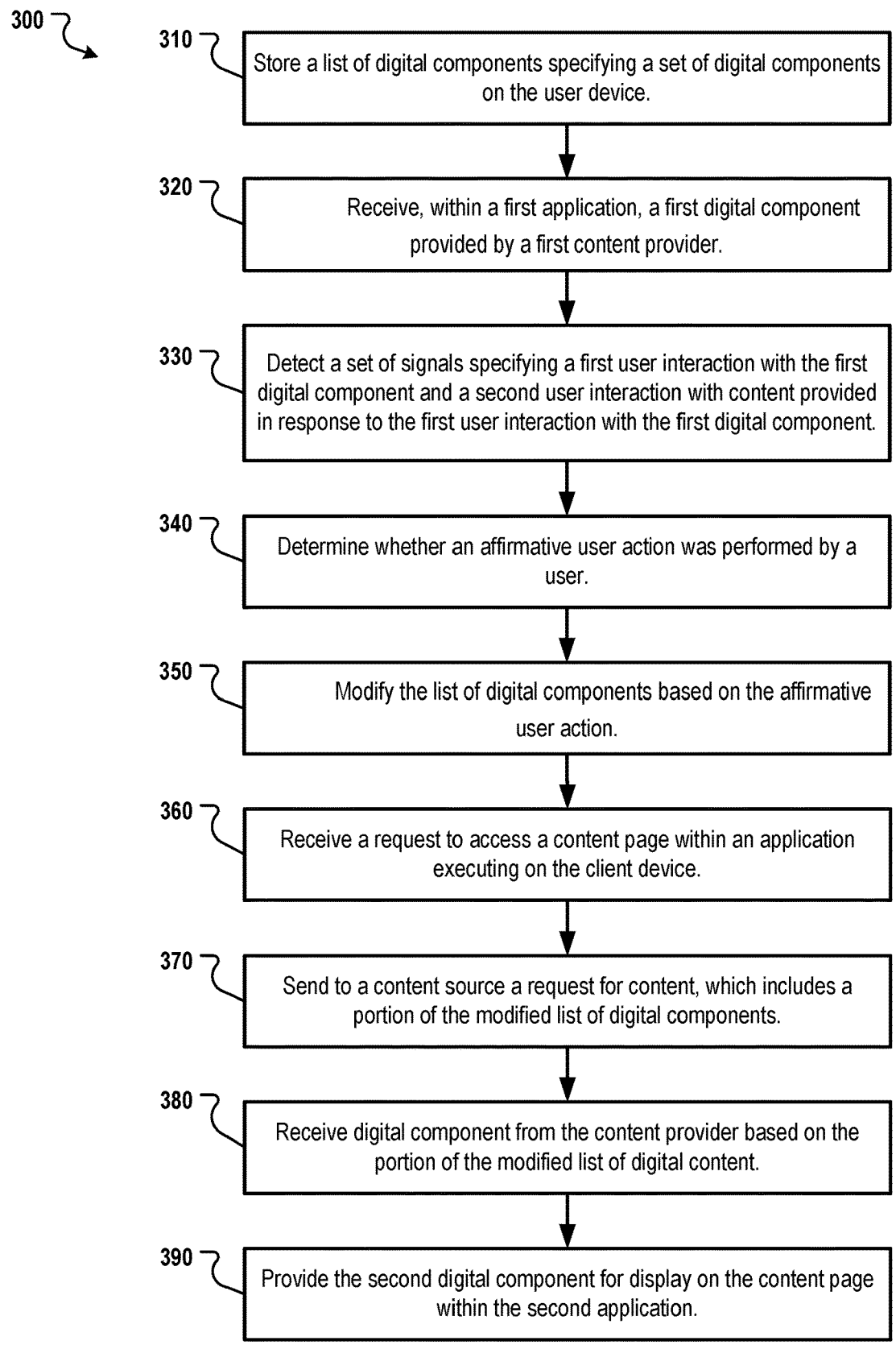
FIG. 3 is a flow diagram of an example process for providing one or more digital components to a client device based on user actions on the client device.

FIG. 3 is the flow diagram of an example process 300 for providing one or more digital components to a client device based on user actions of and/or operations of the client device. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

A list of digital components 130 is stored on the client device and specifies a set of digital components that are available to be provided to an application executing on the client device (310). In some implementations, and as described above with reference to FIG. 2, each entry in the list of digital components 130 describes/represents a digital component that is available to be provided to an application executing on the client device. Entries in the list of digital components 130 are created based at least on user interactions and/or user actions with digital components that are provided to the client device 102 by the content source/platform. For example, the list of digital components 130 represented using the table in FIG. 2 is stored in the device storage 120 of the client device 102. In some implementations, entries in the list of digital components 130 are ranked according to the relative importance to the user. For example, the column 208 shows rank of each entry in the list. In some implementations, the entries in the list of digital components can be ranked with respect to type/category.

A first digital component is provided by a first content source to the application executing on the client device (320). In some implementations, a first content source can provide a first digital component for display within an application executing on the client device 102. For example, the browser based application A 116 executing on the client device 102 may be used to perform an internet search for "rental cars." In response to the search query, the content source/platform provides the search results related to rental cars to the client device 102.

A set of signals is detected by the client device, wherein the set of signals specify a first user interaction with the first digital component and a second user interaction with the content provided in response to the first user interaction (330). In some implementations, the OS of the client device 102 detects a first user interaction with the first digital component. Examples of such first user interactions and/or user actions include a user selecting the first digital component, clicking on the first digital component, and viewing the first digital component (e.g., for a certain period of time). The OS can detect such user interactions and/or user actions by using a set of rules that capture different device events (e.g., time elapsed in a particular application, information about scrolling through content on the client device, the selection/clicking of digital components, content presented/applications or paged opened in response to a selection or clicking of a digital component) and combines one or more of these to determine whether a first interaction was performed. Alternatively, instead of a set of rules, the captured device events can be fed to a model (e.g., a machine learning model or another appropriate statistical model) that is trained to predict whether a first interaction was performed based on a set of device actions. Such a model can be trained, e.g., using actually detected first interactions and the respective corresponding set of device events.

In response to the first user interaction, additional content may be provided within the application executing on the client device 102 by the first content source (or by another content source). Examples of such additional content include content pages that the user is redirected to after selecting the links in the search results that was provided by the content provider in response to submission to search query. The OS can detect a second user interaction with this additional content (which can include, e.g., purchasing a product/service, leaving a review or signing up for a content delivery service) using signals such as the number of clicks or time spent on the webpage. Again, the OS can detect such user interactions and/or user actions by using a set of rules that capture different device events and/or parsing/analysis (e.g., using OCR, image processing, etc.) of the displayed content (obtained after the first user interaction was performed), and combines one or more of these to determine whether a second interaction was performed. Alternatively, instead of a set of rules, the captured device events and/or parsed/analyzed image content can be fed to a model (e.g., a machine learning model or another appropriate statistical model) that is trained to predict whether a second interaction was performed based on a set of device actions. Such a model can be trained, e.g., using actually detected second user interactions and/or user actions and the respective corresponding set of device events.

In addition to the above interactions, the OS can also detect additional signals regarding other device actions and/or data from other applications/services on the device (as described above with reference to FIG. 1). For example, if the user receives a clickable URL in an email or a SMS text, that after selecting opens a webpage on a browser application executing on the client device 102 that shows the confirmation of the rental car booking, the OS will detect signals such as text from the webpage and provide the set of signals to the content evaluation apparatus 114.

The set of signals are used to determine whether an affirmative user action was performed by the user with respect to the first digital component (340). In some implementations, the content evaluation apparatus 114 implements either a machine learning model or a heuristic based approach on the client device 102 that analyzes the set of signals (as detected above in operation 330) to determine whether an affirmative user action occurred (as further described with reference to FIG. 1). For example, if a digital component is provided for display and includes a link to a website regarding a particular product, the user might click the link and visit the linked website. In this case, the user activity generates multiple signals such as number of clicks and the context of content presented in the webpage. The content evaluation apparatus 114 analyzes the signals to determine an affirmative user action of the user with digital components that are provided to the client device 102 by the content source/platform.

In some implementations, and as described with reference to FIG. 1, the machine learning model implemented within the content evaluation apparatus 114 processes the set of signals generated by user interaction with digital component (and other actions on the client device), and performs classification of whether based on the set of signals associated with the user interaction with the digital components (e.g., a first user interaction with the digital component and one or more additional user interactions and/or user actions with content provided in response to the first user interaction) resulted in an affirmative user action or not. In some implementations, the machine learning model may generate a score or a likelihood of an affirmative user action based on the input set of signals (as described with reference to FIG. 1).

The list of digital components 130 is modified and the modified list is stored on the client device 102 (350). If the content evaluation apparatus 114 implemented within the client device 102 identifies an affirmative user action with respect to a particular digital component, it modifies the list of digital components 130 stored on the client device 102. In some implementations, if the content evaluation apparatus determines that an affirmative user action was encountered with the first digital component, the content evaluation apparatus 114 lowers the rank of the particular entry corresponding to the first digital component in the list of digital components, e.g., such that the particular entry is no longer in the top-N ranked components. For example, if the machine learning model implemented within the content evaluation apparatus 114 determines that the user has booked a rental car by analyzing other digital contents accessed by the same browser application or by other applications, the rank of the particular entries in the list of digital components can be lowered. Alternatively, and instead of lowering a rank, the content evaluation apparatus 114 can remove the reference to the digital component from the list of digital components 130.

A request to access a content page is received from an application executing on the client device 102 (360). In order for applications executing on the client device 102 to access a content page provided by a content source/platform, the applications generate a request to access a content page that is transmitted to the content source/platform over the network 104. The content source upon receiving the request to access a content page, transmits the corresponding content page to the client device 102. For example, the user can use the browser application A 116 executing on the client device 102 to perform an internet search, review search results provided in response to the internet search and access multiple digital components by clicking links provided as search results. In such a scenario, the client device 102 generates a request to access a content page that comprises search results. Further, when the user, e.g., clicks the links that are provided as search results, the client device 102 generates the corresponding request to access digital content that is transmitted to the content source over the network 104.

A request for content, which includes a portion of the modified list of digital components, is sent to the second content source. (370). In some implementations, in response to the request to access the content page by the application executing on the client device 102, a script on the content page executes and causes the provision, by the application, of a request for content to the second content source. In some implementations, this request for content includes a portion of the modified digital component list (e.g., the entire list or a subset of the list, such as the top-N ranked digital components). The request for content can also include event data specifying content features, such as the electronic document being requested, name or network location of the server from which the digital component is being requested, a name or network location of the requesting device (e.g., the client device 102).

In some implementations, the portion of the list of digital components 130 that is provided to the content source/platform comprises the top-N entries in the list of digital components 130 where the top-N entries are selected based on the ranking of each individual digital component based on the relative interest of the user. For example, in FIG. 2, entries 1-7 are ranked with respect to the type/category of the digital component. In this case, the client device 102 can provide, to the content source/platform, the portion of the list of digital components 130 that includes entries that are ranked 1.

In some implementations, the portion of the list of digital components 130 that is provided to the content source/platform comprises a combination of one or more features of the digital components listed in the top-N entries in the list of digital components 130 where the top-N entries are selected based on the ranking of each individual digital component based on the relative interest of the user. For example, in FIG. 2, the client device 102 can provide, to the content source/platform, the portion of the list of digital components 130 that includes one or more features such as the product 202 or category 204 of entries that are ranked 1.

A second digital component is received from the content source/platform based on the portion of the modified list of digital components 130 (380). In some implementations, the content source/platform upon receiving the portion of the list of digital components 130, provides the client device 102 those digital components that are among the digital components listed on the received list 130 (e.g., providing digital components from the top-N identified digital components on the list 130). In certain scenarios, the list of digital components can be the modified list of digital components where the list of digital components is modified based on the affirmative user action of the user with other digital components.

For example, assume that the portion of the list of digital components 130 that is provided to the content source/platform comprises of the top-N entries in the list of digital components 130 where the top-N entries are selected based on the ranking of each individual digital component. In such a case the portion of the list of digital components 130 accessed by the content source/platform will comprise of entries 1, 2 and 5 that indicate user interest towards camera, hotel and rental car.

In some implementations, the content source(s) and/or content platform can provide any digital components, irrespective of whether they are on the list. In such cases, the client device can determine whether the digital components provided are on the list of digital components (e.g., whether the provided digital component is one of the top N digital components on the list of digital components). If so, the application executing on the client device can render/display the provided digital components. Otherwise, the application can suppress such content, by not displaying it for example, and optionally the application can instead modify the interface such that the location within which the suppressed/removed digital component would have been displayed is replaced with other content (e.g., content already included on the page that might be adjusted, e.g., reorganized/moved/resized, or other content), which may be obtained from a content source or content platform.

In some implementations, the client device 102 can notify the content platform or the content source about particular digital components that were suppressed and not presented/displayed on the client device 102. The content platform or the content source can use such information to subsequently avoid providing such digital components on the client device 102. The content platform and/or content source may maintain/store information about suppressed/removed content, which can be used to perform analytics that can inform the types of digital components to provide to one or more client devices.

The digital components received from the content source/platform are provided for display within the application executing on the client device 102 (390). In some implementations, the client device 102 upon receiving the digital components from the second content source, provides these digital components for display within the application. For example, assume that the content source/platform upon receiving the portion of the list of digital component provides digital components such content related to camera, hotel and rental car to the client device 102.

In summary, the above described operations limit the provision and display of redundant digital components on a client device with which the client device has already had an affirmative user action. Relatedly, the above-described operations also provide and display digital components (whether previously provided or not) without any restrictions, when no prior affirmative user actions are associated with these digital components.

Figure 4:
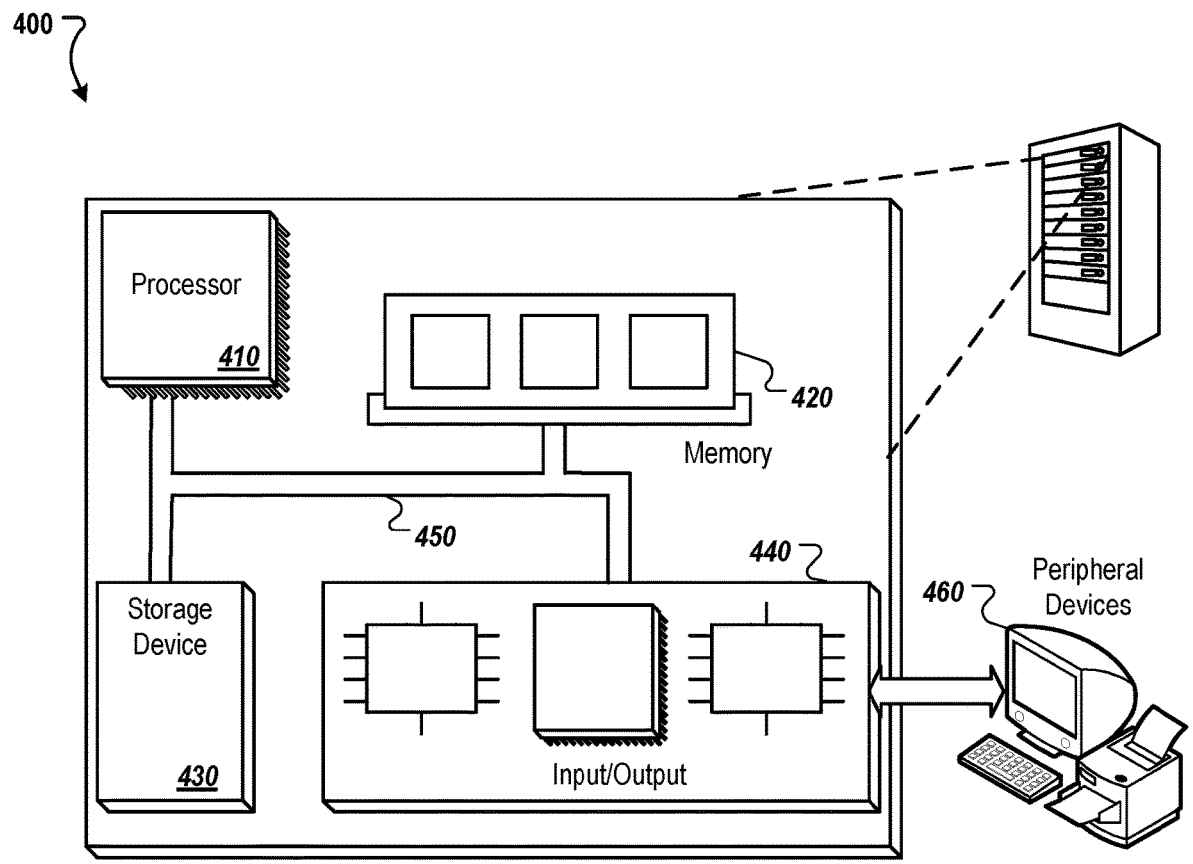
FIG. 4 is a block diagram of an example computer system that can be used to perform operations described.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    storing, by a client device, a list of digital components specifying a set of digital components available to be provided to an application executing on the client device;
    receiving, within a first application executing on the client device, a first digital component provided by a first content provider;
    detecting, by the client device, a set of signals specifying (i) a first user interaction with the first digital component and (ii) a second user interaction with content provided in response to the first user interaction with the first digital component;
    determining, by the client device and based on the set of signals, that an affirmative user action was performed by a user of the client device, wherein the affirmative user action represents performance of a specified target action by the user after the first user interaction with the first digital component;
    modifying, by the client device, the list of digital components based on the affirmative user action by the user after the first user interaction with the first digital component;
    receiving a request to access a content page within a second application executing on the client device;
    in response to receiving the request to access the content page, sending, to a second content provider, a request for content that includes a portion of the modified list of digital components that prevents selection of the first digital component responsive to the request for content;
    in response to the request for content, receiving, by the client device and within the second application, a second digital component from the second content provider, wherein the second digital component is selected from among digital components included on the modified list of digital components; and
    providing the second digital component for display on the content page within the second application.

2. The computer-implemented method of claim 1, wherein determining that an affirmative user action was performed by a user of the client device comprises:
    inputting the set of signals associated with the first digital component into a machine learning model that predicts whether, based on a particular set of signals associated with a particular digital component, the user had an affirmative user action with the particular digital component, wherein:
        the machine learning model is trained using training data for a plurality of training digital components, wherein the training data for each training digital component includes a set of signals associated with the training digital component and a corresponding label indicating whether a user had an affirmative user action with the training digital component; and
    obtaining, from the machine learning model and in response to the set of signals associated with the first digital component that are input into the machine learning model, an indication specifying whether a user had an affirmative user action with the first digital component.

3. The computer-implemented method of claim 1, wherein storing the list of digital components includes storing a ranked list of digital components.

4. The computer-implemented method of claim 3, wherein modifying the list of digital components includes lowering a rank corresponding to the first digital component in the ranked list.

5. The computer implemented method of claim 4, wherein the portion of the modified list of digital components includes a top-N ranked digital components in the ranked list.

6. The computer implemented method of claim 1, wherein modifying the list of digital components includes removing the first digital component from the list of digital components.

7. The computer implemented method of claim 1, wherein:
    in response to the request for content, receiving, by the client device and within the second application, a third digital component from the second content provider, wherein the third digital component is not among digital components included on the modified list of digital components; and
    suppressing the third digital component from display on the content page.

8. The computer implemented method of claim 7, wherein:
    in response to the suppressing, modifying a content layout of the content page.

9. The computer-implemented method of claim 7, further comprising:
    providing a message to the second content provider indicating that the third digital component was suppressed.

10. The computer-implemented method of claim 1, wherein the first content provider is different from the second content provider and the first application is different from the second application.

11. A system, comprising:
  storing, by a client device, a list of digital components specifying a set of digital components available to be provided to an application executing on the client device;
  receiving, within a first application executing on the client device, a first digital component provided by a first content provider;
  detecting, by the client device, a set of signals specifying (i) a first user interaction with the first digital component and (ii) a second user interaction with content provided in response to the first user interaction with the first digital component;
  determining, by the client device and based on the set of signals, that an affirmative user action was performed by a user of the client device, wherein the affirmative user action represents performance of a specified target action by the user after the first user interaction with the first digital component;
  modifying, by the client device, the list of digital components based on the affirmative user action by the user after the first user interaction with the first digital component;
  receiving a request to access a content page within a second application executing on the client device;
  in response to receiving the request to access the content page, sending, to a second content provider, a request for content that includes a portion of the modified list of digital components that prevents selection of the first digital component responsive to the request for content;
  in response to the request for content, receiving, by the client device and within the second application, a second digital component from the second content provider, wherein the second digital component is selected from among digital components included on the modified list of digital components; and
  providing the second digital component for display on the content page within the second application.

12. The system of claim 11, wherein determining that an affirmative user action was performed by a user of the client device comprises:
  inputting the set of signals associated with the first digital component into a machine learning model that predicts whether, based on a particular set of signals associated with a particular digital component, the user had an affirmative user action with the particular digital component, wherein:
    the machine learning model is trained using training data for a plurality of training digital components, wherein the training data for each training digital component includes a set of signals associated with the training digital component and a corresponding label indicating whether a user had an affirmative user action with the training digital component; and
  obtaining, from the machine learning model and in response to the set of signals associated with the first digital component that are input into the machine learning model, an indication specifying whether a user had an affirmative user action with the first digital component.

13. The system of claim 11, wherein storing the list of digital components includes storing a ranked list of digital components.

14. The system of claim 11, wherein:
  in response to the request for content, receiving, by the client device and within the second application, a third digital component from the second content provider, wherein the third digital component is not among digital components included on the modified list of digital components; and
  suppressing the third digital component from display on the content page.

15. The system of claim 11, wherein the first content provider is different from the second content provider and the first application is different from the second application.

16. A non-transitory computer readable medium storing instructions that, when executed by one or more data processing apparatus, cause the one or more data processing apparatus to perform operations comprising:
  storing, by a client device, a list of digital components specifying a set of digital components available to be provided to an application executing on the client device;
  receiving, within a first application executing on the client device, a first digital component provided by a first content provider;
  detecting, by the client device, a set of signals specifying (i) a first user interaction with the first digital component and (ii) a second user interaction with content provided in response to the first user interaction with the first digital component;
  determining, by the client device and based on the set of signals, that an affirmative user action was performed by a user of the client device, wherein the affirmative user action represents performance of a specified target action by the user after the first user interaction with the first digital component;
  modifying, by the client device, the list of digital components based on the affirmative user action by the user after the first user interaction with the first digital component;
  receiving a request to access a content page within a second application executing on the client device;
  in response to receiving the request to access the content page, sending, to a second content provider, a request for content that includes a portion of the modified list of digital components that prevents selection of the first digital component responsive to the request for content;
  in response to the request for content, receiving, by the client device and within the second application, a second digital component from the second content provider, wherein the second digital component is selected from among digital components included on the modified list of digital components; and
  providing the second digital component for display on the content page within the second application.

17. The non-transitory computer readable medium of claim 16, wherein determining that an affirmative user action was performed by a user of the client device comprises:
  inputting the set of signals associated with the first digital component into a machine learning model that predicts whether, based on a particular set of signals associated with a particular digital component, the user had an affirmative user action with the particular digital component, wherein:
    the machine learning model is trained using training data for a plurality of training digital components, wherein the training data for each training digital component includes a set of signals associated with the training digital component and a corresponding label indicating whether a user had an affirmative user action with the training digital component; and obtaining, from the machine learning model and in response to the set of signals associated with the first digital component that are input into the machine learning model, an indication specifying whether a user had an affirmative user action with the first digital component.

18. The non-transitory computer readable medium of claim 16, wherein storing the list of digital components includes storing a ranked list of digital components.

19. The non-transitory computer readable medium of claim 16, wherein:

in response to the request for content, receiving, by the client device and within the second application, a third digital component from the second content provider, wherein the third digital component is not among digital components included on the modified list of digital components; and suppressing the third digital component from display on the content page.

20. The non-transitory computer readable medium of claim 16, wherein the first content provider is different from the second content provider and the first application is different from the second application.

* * * * *